US011100478B2

(12) United States Patent
Hsieh et al.

(10) Patent No.: US 11,100,478 B2
(45) Date of Patent: *Aug. 24, 2021

(54) RECURRING EVENT ANALYSES AND DATA PUSH

(71) Applicant: Bank of America Corporation, Charlotte, NC (US)

(72) Inventors: Matthew Hsieh, Charlotte, NC (US); Linda Yoon Lentz, San Jose, CA (US); Gail Mohr, Menlo Park, CA (US); Alicia C. Jones-McFadden, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 142 days.

This patent is subject to a terminal disclaimer.

(21) Appl. No.: 16/425,298

(22) Filed: May 29, 2019

(65) Prior Publication Data

US 2019/0279176 A1  Sep. 12, 2019

Related U.S. Application Data

(63) Continuation of application No. 14/987,714, filed on Jan. 4, 2016, now Pat. No. 10,373,131.

(51) Int. Cl.
  *G06Q 20/10* (2012.01)
  *G06Q 20/40* (2012.01)
  (Continued)

(52) U.S. Cl.
  CPC .......... *G06Q 20/102* (2013.01); *G06F 9/50* (2013.01); *G06Q 10/1097* (2013.01);
  (Continued)

(58) Field of Classification Search
CPC combination set(s) only.
See application file for complete search history.

(56) References Cited

U.S. PATENT DOCUMENTS 5,642,279 A  6/1997 Bloomberg et al.
5,948,040 A  9/1999 Delorme et al.
(Continued)

OTHER PUBLICATIONS

Citi Begins Offering Customers Contactless-Payment Stickers Payments Source 1 Thursday, Jun. 10, 2010 by Will Hernandez.
(Continued)

*Primary Examiner* — Zeshan Qayyum
*Assistant Examiner* — Yingying Zhou
(74) *Attorney, Agent, or Firm* — Michael A. Springs; Moore & Van Allen PLLC; Peter B. Stewart

(57) ABSTRACT

Systems, methods and computer program products for allocation of resources based on event triggers are provided. As an example, the system receives a set of electronic guidelines outlining scheduled allocation of resources based on detection of trigger events, where the resources are transferred electronically from a source to a destination. The system parses the electronic guidelines into a set of event triggers associated with resource allocations and monitor activities associated events related to allocation resources. From the monitoring, the system identifies a triggering event in the activities that is associated with a resource allocation as defined in the electronic guidelines and transfers an allocation of the resources electronically from the source to the destination based on the triggering event.

13 Claims, 4 Drawing Sheets

(51) Int. Cl.
   *G06Q 10/10* (2012.01)
   *G06Q 50/18* (2012.01)
   *G06Q 20/38* (2012.01)
   *G06F 9/50* (2006.01)
   *G06Q 20/36* (2012.01)

(52) U.S. Cl.
   CPC ....... *G06Q 20/3674* (2013.01); *G06Q 20/385* (2013.01); *G06Q 20/38215* (2013.01); *G06Q 20/401* (2013.01); *G06Q 20/4012* (2013.01); *G06Q 50/18* (2013.01)

(56) References Cited

U.S. PATENT DOCUMENTS

| | | | |
|---|---|---|---|
| 6,026,370 | A | 2/2000 | Jermyn |
| 6,112,190 | A | 8/2000 | Fletcher et al. |
| 6,199,754 | B1 | 3/2001 | Epstein |
| 6,430,539 | B1 | 8/2002 | Lazarus et al. |
| 6,845,361 | B1 | 1/2005 | Dowling |
| 6,999,943 | B1 | 2/2006 | Johnson et al. |
| 7,003,493 | B2 * | 2/2006 | Weichert ............... G06Q 20/00 235/379 |
| 7,050,997 | B1 | 5/2006 | Wood, Jr. |
| 7,319,479 | B1 | 1/2008 | Crabtree et al. |
| 7,379,922 | B2 | 5/2008 | Pericle |
| 7,428,988 | B1 | 9/2008 | Starr |
| 7,437,330 | B1 | 10/2008 | Robinson et al. |
| 7,533,038 | B2 | 5/2009 | Blume et al. |
| 7,606,750 | B1 | 10/2009 | Hoag et al. |
| 7,624,073 | B1 | 11/2009 | Robinson et al. |
| 7,637,426 | B1 | 12/2009 | Green |
| 7,644,079 | B2 | 1/2010 | Sastry et al. |
| 7,665,658 | B2 | 2/2010 | Fields |
| 7,668,821 | B1 | 2/2010 | Donsbach et al. |
| 7,707,089 | B1 | 4/2010 | Barton et al. |
| 7,712,657 | B1 | 5/2010 | Block et al. |
| 7,740,172 | B1 | 6/2010 | Hubert et al. |
| 7,756,926 | B2 | 7/2010 | Tseng et al. |
| 7,778,769 | B2 | 8/2010 | Boss et al. |
| 7,778,933 | B2 | 8/2010 | Robinson et al. |
| 7,788,151 | B2 | 8/2010 | Pizzi et al. |
| 7,801,758 | B2 | 9/2010 | Gracie et al. |
| 7,814,016 | B2 | 10/2010 | Pranger |
| 7,856,403 | B2 | 12/2010 | Venturo et al. |
| 7,870,069 | B2 | 1/2011 | Steele et al. |
| 7,941,344 | B1 | 5/2011 | Bickerstaff |
| 7,941,368 | B2 | 5/2011 | Chang et al. |
| 7,954,708 | B2 | 6/2011 | Blossom |
| 7,966,329 | B1 | 6/2011 | Rukonic et al. |
| 7,974,867 | B2 | 7/2011 | Gracie et al. |
| 8,005,753 | B2 | 8/2011 | Davis |
| 8,006,900 | B2 | 8/2011 | Grigsby et al. |
| 8,027,891 | B2 | 9/2011 | Preston et al. |
| 8,046,260 | B2 | 10/2011 | Haddad et al. |
| 8,060,423 | B1 | 11/2011 | Rukonic et al. |
| 8,073,460 | B1 | 12/2011 | Scofield et al. |
| 8,090,656 | B2 | 1/2012 | Solomon et al. |
| 8,091,778 | B1 | 1/2012 | Block et al. |
| 8,096,470 | B2 | 1/2012 | Mink |
| 8,122,020 | B1 | 2/2012 | Donsbach et al. |
| 8,132,720 | B2 | 3/2012 | Dyor |
| 8,170,932 | B1 | 5/2012 | Krakowiecki et al. |
| 8,175,961 | B2 | 5/2012 | Reid et al. |
| 8,180,682 | B2 | 5/2012 | Narayanaswami et al. |
| 8,181,789 | B2 | 5/2012 | Casella et al. |
| 8,229,806 | B1 | 7/2012 | Chapman et al. |
| 8,255,268 | B2 | 8/2012 | Rane et al. |
| 8,285,622 | B1 | 10/2012 | Rao et al. |
| 8,296,229 | B1 | 10/2012 | Yellin et al. |
| 8,332,288 | B2 | 12/2012 | Preston et al. |
| 8,335,728 | B1 | 12/2012 | Dahodwala et al. |
| 8,346,664 | B1 | 1/2013 | Klieman et al. |
| 8,359,274 | B2 | 1/2013 | Yoder et al. |
| 8,380,590 | B1 | 2/2013 | Rukonic et al. |
| 8,429,277 | B2 | 4/2013 | Dale et al. |
| 8,447,674 | B2 | 5/2013 | Choudhuri et al. |
| 8,478,691 | B2 | 7/2013 | Solomon et al. |
| 8,504,423 | B2 | 8/2013 | Rotbard et al. |
| 8,566,203 | B1 | 10/2013 | Vieira et al. |
| 8,583,549 | B1 | 11/2013 | Mohsenzadeh |
| 8,650,123 | B2 | 2/2014 | Summerrow et al. |
| 8,694,456 | B2 | 4/2014 | Grigg et al. |
| 8,706,587 | B1 | 4/2014 | Bautista, Jr. et al. |
| 8,725,569 | B2 | 5/2014 | Liang et al. |
| 8,856,121 | B1 | 10/2014 | Makki et al. |
| 8,861,804 | B1 | 10/2014 | Johnson et al. |
| 8,892,461 | B2 | 11/2014 | Lau et al. |
| 8,930,204 | B1 | 1/2015 | Igoe et al. |
| 8,949,013 | B2 | 2/2015 | Yang et al. |
| 9,002,730 | B2 | 4/2015 | Postrel |
| 9,112,850 | B1 | 8/2015 | Eisen |
| 9,123,045 | B2 | 9/2015 | Burrell |
| 2001/0037315 | A1 | 11/2001 | Saliba et al. |
| 2002/0035541 | A1 | 3/2002 | Makino et al. |
| 2002/0095333 | A1 | 7/2002 | Jokinen et al. |
| 2002/0099649 | A1 | 7/2002 | Lee et al. |
| 2002/0099657 | A1 | 7/2002 | Black et al. |
| 2002/0120837 | A1 | 8/2002 | Maxemchuk et al. |
| 2002/0194055 | A1 | 12/2002 | Takakura et al. |
| 2003/0055733 | A1 | 3/2003 | Marshall et al. |
| 2003/0065805 | A1 | 4/2003 | Barnes, Jr. |
| 2003/0076849 | A1 | 4/2003 | Morgan et al. |
| 2003/0105685 | A1 | 6/2003 | Millikan |
| 2003/0105710 | A1 | 6/2003 | Barbara et al. |
| 2003/0107649 | A1 | 6/2003 | Flickner et al. |
| 2003/0212620 | A1 | 11/2003 | Blagg |
| 2004/0006533 | A1 | 1/2004 | Lawrence |
| 2004/0122736 | A1 | 6/2004 | Strock et al. |
| 2004/0243468 | A1 | 12/2004 | Cohagan et al. |
| 2005/0021456 | A1 | 1/2005 | Steele et al. |
| 2005/0021478 | A1 | 1/2005 | Gautier et al. |
| 2005/0033664 | A1 | 2/2005 | Moon et al. |
| 2005/0039214 | A1 | 2/2005 | Lorenz et al. |
| 2005/0125317 | A1 | 6/2005 | Winkelman et al. |
| 2005/0171799 | A1 | 8/2005 | Hull et al. |
| 2005/0177385 | A1 | 8/2005 | Hull et al. |
| 2005/0209921 | A1 | 9/2005 | Roberts et al. |
| 2005/0221806 | A1 | 10/2005 | Sengupta et al. |
| 2005/0228766 | A1 | 10/2005 | Roberts et al. |
| 2006/0047553 | A1 | 3/2006 | Fuhrmann et al. |
| 2006/0149674 | A1 | 7/2006 | Cook et al. |
| 2006/0207856 | A1 | 9/2006 | Dean et al. |
| 2006/0265339 | A1 | 11/2006 | Vakil et al. |
| 2006/0271431 | A1 | 11/2006 | Wehr et al. |
| 2006/0273153 | A1 | 12/2006 | Ashby et al. |
| 2007/0032244 | A1 | 2/2007 | Counts et al. |
| 2007/0038565 | A1 | 2/2007 | Bartz et al. |
| 2007/0055554 | A1 | 3/2007 | Sussman et al. |
| 2007/0095892 | A1 | 5/2007 | Lyons et al. |
| 2007/0127691 | A1 | 6/2007 | Lert |
| 2007/0162353 | A1 | 7/2007 | Borders et al. |
| 2007/0219852 | A1 | 9/2007 | Anglum |
| 2007/0244741 | A1 | 10/2007 | Blume et al. |
| 2007/0255854 | A1 | 11/2007 | Khosravy et al. |
| 2007/0260532 | A1 | 11/2007 | Blake, III |
| 2007/0288355 | A1 | 12/2007 | Roland et al. |
| 2008/0082349 | A1 | 4/2008 | Zackrison et al. |
| 2008/0091528 | A1 | 4/2008 | Rampell et al. |
| 2008/0120125 | A1 | 5/2008 | Chavez |
| 2008/0140509 | A1 | 6/2008 | Amjadi |
| 2008/0162268 | A1 | 7/2008 | Gilbert |
| 2008/0167887 | A1 | 7/2008 | Marcken |
| 2008/0183579 | A1 | 7/2008 | Avner |
| 2008/0262928 | A1 | 10/2008 | Michaelis |
| 2008/0275741 | A1 | 11/2008 | Loeffen |
| 2008/0300956 | A1 | 12/2008 | Nishikawa et al. |
| 2009/0024484 | A1 | 1/2009 | Walker et al. |
| 2009/0045251 | A1 | 2/2009 | Jaiswal et al. |
| 2009/0076875 | A1 | 3/2009 | Lert, Jr. et al. |
| 2009/0119371 | A1 | 5/2009 | Chang et al. |
| 2009/0125230 | A1 | 5/2009 | Sullivan |
| 2009/0125598 | A1 | 5/2009 | Sun et al. |
| 2009/0138317 | A1 | 5/2009 | Schoenberg |
| 2009/0157307 | A1 | 6/2009 | Krumm et al. |

(56) References Cited

U.S. PATENT DOCUMENTS

| | | |
|---|---|---|
| 2009/0164267 A1 | 6/2009 | Banatwala et al. |
| 2009/0192892 A1 | 7/2009 | Cason |
| 2009/0216551 A1 | 8/2009 | Chen et al. |
| 2009/0222364 A1 | 9/2009 | McGlynn et al. |
| 2009/0240624 A1* | 9/2009 | James .................... G06Q 20/12 705/44 |
| 2009/0252318 A1 | 10/2009 | Smith et al. |
| 2009/0265197 A1 | 10/2009 | Chan |
| 2009/0271287 A1 | 10/2009 | Halpern |
| 2009/0307003 A1 | 12/2009 | Benyamin et al. |
| 2009/0324103 A1 | 12/2009 | Gelfand et al. |
| 2010/0005400 A1 | 1/2010 | Swift |
| 2010/0057574 A1 | 3/2010 | Banerjee et al. |
| 2010/0057620 A1 | 3/2010 | Li et al. |
| 2010/0058196 A1 | 3/2010 | Krishnan et al. |
| 2010/0082454 A1 | 4/2010 | Narayanaswami et al. |
| 2010/0100693 A1 | 4/2010 | Kerley et al. |
| 2010/0131340 A1 | 5/2010 | Brown et al. |
| 2010/0145836 A1 | 6/2010 | Baker et al. |
| 2010/0151821 A1 | 6/2010 | Sweeney et al. |
| 2010/0153242 A1 | 6/2010 | Preston et al. |
| 2010/0161379 A1 | 6/2010 | Bene et al. |
| 2010/0161600 A1 | 6/2010 | Higgins et al. |
| 2010/0174709 A1 | 7/2010 | Hansen et al. |
| 2010/0191581 A1 | 7/2010 | Furin et al. |
| 2010/0211499 A1 | 8/2010 | Zanzot et al. |
| 2010/0211535 A1 | 8/2010 | Rosenberger |
| 2010/0217525 A1 | 8/2010 | King et al. |
| 2010/0241519 A1 | 9/2010 | Lindahl et al. |
| 2010/0241559 A1 | 9/2010 | O'Connor et al. |
| 2010/0250419 A1 | 9/2010 | Ariff et al. |
| 2010/0250420 A1 | 9/2010 | Ariff et al. |
| 2010/0250421 A1 | 9/2010 | Ariff et al. |
| 2010/0250430 A1 | 9/2010 | Ariff et al. |
| 2010/0268629 A1 | 10/2010 | Ross et al. |
| 2010/0268645 A1 | 10/2010 | Martino et al. |
| 2010/0280882 A1 | 11/2010 | Faith et al. |
| 2010/0287196 A1 | 11/2010 | Shields et al. |
| 2011/0004497 A1 | 1/2011 | Mortimore, Jr. et al. |
| 2011/0014905 A1 | 1/2011 | Eschenauer et al. |
| 2011/0035681 A1 | 2/2011 | Mandel et al. |
| 2011/0040665 A1 | 2/2011 | Long |
| 2011/0055081 A1 | 3/2011 | Vasten |
| 2011/0083101 A1 | 4/2011 | Sharon et al. |
| 2011/0087674 A1 | 4/2011 | Schokking et al. |
| 2011/0099045 A1 | 4/2011 | Carr et al. |
| 2011/0137689 A1 | 6/2011 | Chua et al. |
| 2011/0153312 A1 | 6/2011 | Roberts |
| 2011/0166911 A1 | 7/2011 | Newman et al. |
| 2011/0184823 A1 | 7/2011 | Phillips |
| 2011/0196782 A1* | 8/2011 | Allen .................... G06Q 20/10 705/39 |
| 2011/0196863 A1 | 8/2011 | Marcucci et al. |
| 2011/0208586 A1 | 8/2011 | Joa et al. |
| 2011/0208588 A1 | 8/2011 | Joa et al. |
| 2011/0211764 A1 | 9/2011 | Krupka et al. |
| 2011/0238478 A1 | 9/2011 | Gottfurcht et al. |
| 2011/0270869 A1* | 11/2011 | Waldron, III ........ G06Q 10/107 707/769 |
| 2011/0302057 A1 | 12/2011 | Karon et al. |
| 2011/0320294 A1 | 12/2011 | Votaw et al. |
| 2012/0047003 A1 | 2/2012 | Hammad et al. |
| 2012/0059576 A1 | 3/2012 | Lee et al. |
| 2012/0066064 A1 | 3/2012 | Yoder et al. |
| 2012/0101829 A1 | 4/2012 | Hunt |
| 2012/0123790 A1 | 5/2012 | Kenyon |
| 2012/0130870 A1 | 5/2012 | Shergill et al. |
| 2012/0140993 A1 | 6/2012 | Bruso et al. |
| 2012/0143674 A1 | 6/2012 | Ziskrout et al. |
| 2012/0143755 A1 | 6/2012 | Burrell |
| 2012/0143931 A1 | 6/2012 | Rosenberger et al. |
| 2012/0150736 A1 | 6/2012 | Dickerson et al. |
| 2012/0159647 A1 | 6/2012 | Sanin et al. |
| 2012/0166311 A1 | 6/2012 | Dwight et al. |
| 2012/0191606 A1 | 7/2012 | Milne |
| 2012/0209719 A1 | 8/2012 | Plut |
| 2012/0209720 A1 | 8/2012 | Plut |
| 2012/0209775 A1 | 8/2012 | Milne |
| 2012/0215597 A1 | 8/2012 | Ross |
| 2012/0215604 A1 | 8/2012 | Canetto |
| 2012/0215615 A1 | 8/2012 | Moredock |
| 2012/0221388 A1 | 8/2012 | Ross |
| 2012/0229657 A1 | 9/2012 | Calman et al. |
| 2012/0239485 A1 | 9/2012 | Hu et al. |
| 2012/0271691 A1 | 10/2012 | Hammed et al. |
| 2012/0281094 A1 | 11/2012 | Forshaw |
| 2012/0290389 A1 | 11/2012 | Greenough et al. |
| 2012/0290431 A1 | 11/2012 | Tedjamulia et al. |
| 2012/0296768 A1 | 11/2012 | Fremont-Smith et al. |
| 2012/0310657 A1 | 12/2012 | Jankowski et al. |
| 2012/0310764 A1 | 12/2012 | Sinsheimer et al. |
| 2012/0330971 A1 | 12/2012 | Thomas et al. |
| 2013/0006742 A1 | 1/2013 | Richard |
| 2013/0013516 A1 | 1/2013 | Hamilton |
| 2013/0013689 A1 | 1/2013 | Crawford |
| 2013/0027561 A1 | 1/2013 | Lee et al. |
| 2013/0030925 A1 | 1/2013 | Calman et al. |
| 2013/0030994 A1 | 1/2013 | Calman et al. |
| 2013/0041819 A1 | 2/2013 | Khasho |
| 2013/0046591 A1 | 2/2013 | Yao |
| 2013/0046602 A1 | 2/2013 | Grigg et al. |
| 2013/0046603 A1 | 2/2013 | Grigg et al. |
| 2013/0046626 A1 | 2/2013 | Grigg et al. |
| 2013/0046702 A1 | 2/2013 | Ross et al. |
| 2013/0066964 A1 | 3/2013 | Odio et al. |
| 2013/0073377 A1 | 3/2013 | Heath |
| 2013/0073473 A1 | 3/2013 | Heath |
| 2013/0080239 A1 | 3/2013 | Okerlund |
| 2013/0080922 A1 | 3/2013 | Elias et al. |
| 2013/0117184 A1 | 5/2013 | Ciurea |
| 2013/0117695 A1 | 5/2013 | Hammoud |
| 2013/0178190 A1 | 7/2013 | Celi, Jr. et al. |
| 2013/0211913 A1 | 8/2013 | Ross |
| 2013/0246342 A1 | 9/2013 | Faith et al. |
| 2013/0265432 A1 | 10/2013 | Freedman et al. |
| 2013/0346311 A1 | 12/2013 | Boding et al. |
| 2014/0019189 A1 | 1/2014 | Linton |
| 2014/0081750 A1 | 3/2014 | Hosp |
| 2014/0089070 A1 | 3/2014 | Stockwell et al. |
| 2014/0101012 A1 | 4/2014 | Kuznetsov |
| 2014/0122467 A1 | 5/2014 | Mandel et al. |
| 2014/0129357 A1 | 5/2014 | Goodwin |
| 2014/0153400 A1 | 6/2014 | Lee et al. |
| 2014/0156506 A1 | 6/2014 | Grigg et al. |
| 2014/0164178 A1 | 6/2014 | Adjaoute |
| 2014/0164223 A1 | 6/2014 | Grigg et al. |
| 2014/0164224 A1 | 6/2014 | Grigg et al. |
| 2014/0180919 A1* | 6/2014 | Brown ............... G06Q 20/1085 705/42 |
| 2014/0222684 A1 | 8/2014 | Felsher |
| 2014/0250126 A1 | 9/2014 | Baldwin et al. |
| 2014/0278212 A1 | 9/2014 | Torgersrud et al. |
| 2014/0279068 A1 | 9/2014 | Systrom et al. |
| 2014/0279303 A1 | 9/2014 | van Dam et al. |
| 2014/0289210 A1 | 9/2014 | Taank et al. |
| 2014/0316829 A1 | 10/2014 | Bumbernick |
| 2014/0358727 A1 | 12/2014 | Shannon et al. |
| 2015/0019409 A1 | 1/2015 | Vagiri |
| 2015/0032638 A1 | 1/2015 | Dintenfass et al. |
| 2015/0039513 A1 | 2/2015 | Adjaoute |
| 2015/0088679 A1 | 3/2015 | Votaw et al. |
| 2015/0088704 A1 | 3/2015 | Votaw et al. |
| 2015/0088705 A1 | 3/2015 | Votaw et al. |
| 2015/0088712 A1 | 3/2015 | Votaw et al. |
| 2015/0088713 A1 | 3/2015 | Votaw et al. |
| 2015/0088714 A1 | 3/2015 | Votaw et al. |
| 2015/0088715 A1 | 3/2015 | Votaw et al. |
| 2015/0088716 A1 | 3/2015 | Votaw et al. |
| 2015/0088717 A1 | 3/2015 | Votaw et al. |
| 2015/0088718 A1 | 3/2015 | Votaw et al. |
| 2015/0088915 A1 | 3/2015 | Votaw et al. |
| 2015/0156744 A1 | 6/2015 | Haro |

(56) References Cited

U.S. PATENT DOCUMENTS

2015/0294362 A1 10/2015 Royyuru et al.
2016/0210450 A1 7/2016 Su
2016/0275470 A1 9/2016 Straw et al.

OTHER PUBLICATIONS

Citi Launches Contactless Credit Sticker Published: May 26, 2010 NFC Times.
How Issuers Can Deliver Mobile Payments Today: A Guide for Contactless Sticker Issuance an Issuer White Paper Discover® New Technologies, Nov. 2009.
GO-Tag™ Visa® Prepaid Debit Card & Sticker Frequently Asked Questions.
How do I activate credit cards? By Astrella Hunt on Jun. 9, 2010.
Starbucks Launches iPhone Apps Sep. 22, 2009 by KC Maclaren.
SoCal Credit Card; Received and Activated WaMU Credit Card; Saturday May 31, 2008.
SoCal2 Saturday, May 31, 2008.
Sheetz Offers GO-Tag™ Contactless Payment Sticker, Jun. 26, 2009.
WaMu Tap & Go™ with your new Debit MasterCard; retrieved on Feb. 6, 2013.
White, "How Computers Work" Special 10th Anniversary, Que, Seventh Edition; Published Oct. 15, 2003; Copyright 2004, 23 pages.

\* cited by examiner

RECURRING EVENT ANALYSES AND DATA PUSH

CROSS-REFERENCE TO RELATED APPLICATION

This application is a continuation of U.S. patent application Ser. No. 14/987,714, filed Jan. 4, 2016, now published as U.S. Patent Application Publication No. 2017/0193472, and titled "RECURRING EVENT ANALYSES AND DATA PUSH," the entire disclosure of which is hereby incorporated herein by reference in its entirety.

FIELD OF THE INVENTION

The current invention relates to a transfer of allocated resources based on an electronic schedule, whereby resources are released overtime based on detection of triggers, where the triggers indicate the amount of resources to allocate.

BACKGROUND

Triggering of resource allocation based on event occurrence can be tedious and difficult to implement. Many traditional systems require manual detection and manual resource allocation. This may be burdensome where there are either a large number of resource allocations and/or a large number of potential triggers. Guidelines for resource allocation in installments based on triggers may be provided, but manual review and initiation of allocation is non-optimal.

BRIEF SUMMARY OF THE INVENTION

Embodiments of the invention are directed to systems, methods and computer program products for allocation of resources based on event triggers. As an example, in one embodiment, the system comprises a memory, one or more processors, and a module stored in memory comprising code executable by the one or more processors, when executed by the one or more processors. The system receives a set of electronic guidelines outlining scheduled allocation of resources based on detection of trigger events, where the resources are transferred electronically from a source to a destination. The system parses the electronic guidelines into a set of event triggers associated with resource allocations and monitor activities associated events related to allocation resources. From the monitoring, the system identifies a triggering event in the activities that is associated with a resource allocation as defined in the electronic guidelines and transfers an allocation of the resources electronically from the source to the destination based on the triggering event. In one embodiment, as part of the transfer, the system transmits a unique electronic token to the destination where the token may be used to claim resources associated with the token from the source.

Embodiments of the invention are similarly directed to systems, methods and computer program products for transferring funds of for a due payment to a service provider. In some embodiments, the invention is configured to receive electronic information regarding a contract between a service provider and a customer of the service provider, where the contract includes various guidelines defining scheduled payments to be made from an account of the customer to the service provider when certain triggering events occur. The one or more scheduled payments are completed using a financial account of the customer managed by a financial institution.

Additionally, the invention may be configured to determine that the service provider does not own an account that is managed by the financial institution, and determine that a scheduled payment under the contract is due. The invention may communicate, to the service provider, a unique token for releasing funds to the service provider that satisfy the due scheduled payment under the contract. The invention may identify that a transaction machine has processed the unique token and transfer funds based thereon.

In some embodiments, the invention may be configured to generate a temporary account for receiving funds of the due scheduled payment under the contract. After the temporary account is generated, the invention may transfer an amount of funds from the financial account of the customer to the temporary account. The invention may then receive a request from the service provider to convert the temporary account into a regular account. The invention may then convert the temporary account into a regular account based at least in part on receiving the request from the service provider to convert the temporary account into the regular account.

In other embodiments, the invention may receive a triggering event associated with the scheduled payment under the contract. The invention may then determine an occurrence of the triggering event, thus resulting in the determination that the scheduled payment under the contract is due.

In some embodiments, communicating the unique token to the service provider is based on receiving permission from the customer to release the funds that satisfy the due scheduled payment under the contract.

In yet other embodiments, the invention may be configured to receive an indication comprising a financial account owned by the service provider for receiving the funds that satisfy the due scheduled payment under the contact. The financial account owned by the service provider is managed by a second financial institution. The invention may then transfer the funds that satisfy the due scheduled payment under the contract to the financial account owned by the service provider.

Additionally, the invention may be configured to receive an indication that the service provider desires to receive cash payment of the funds that satisfy the due scheduled payment under the contact. The invention may then cause the transaction machine to either: (i) generate a prepaid transaction card for a selected amount, or (ii) dispense the selected amount of cash. The selected amount is determined based on the funds that satisfy the due scheduled payment under the contract.

In other embodiments, the invention may associate the unique token with a computing device of the service provider. The invention may receive the unique token after the unique token is processed by the transaction machine, wherein the unique token is modified by the computing device to further comprise an identifier of the computing device of the service provider. Further, the invention may determine, based on the identifier of the computing device of the service provider, that the computing device communicated the unique token to the transaction machine; thereby authenticating the unique token.

BRIEF DESCRIPTION OF THE DRAWINGS

Figure 1:
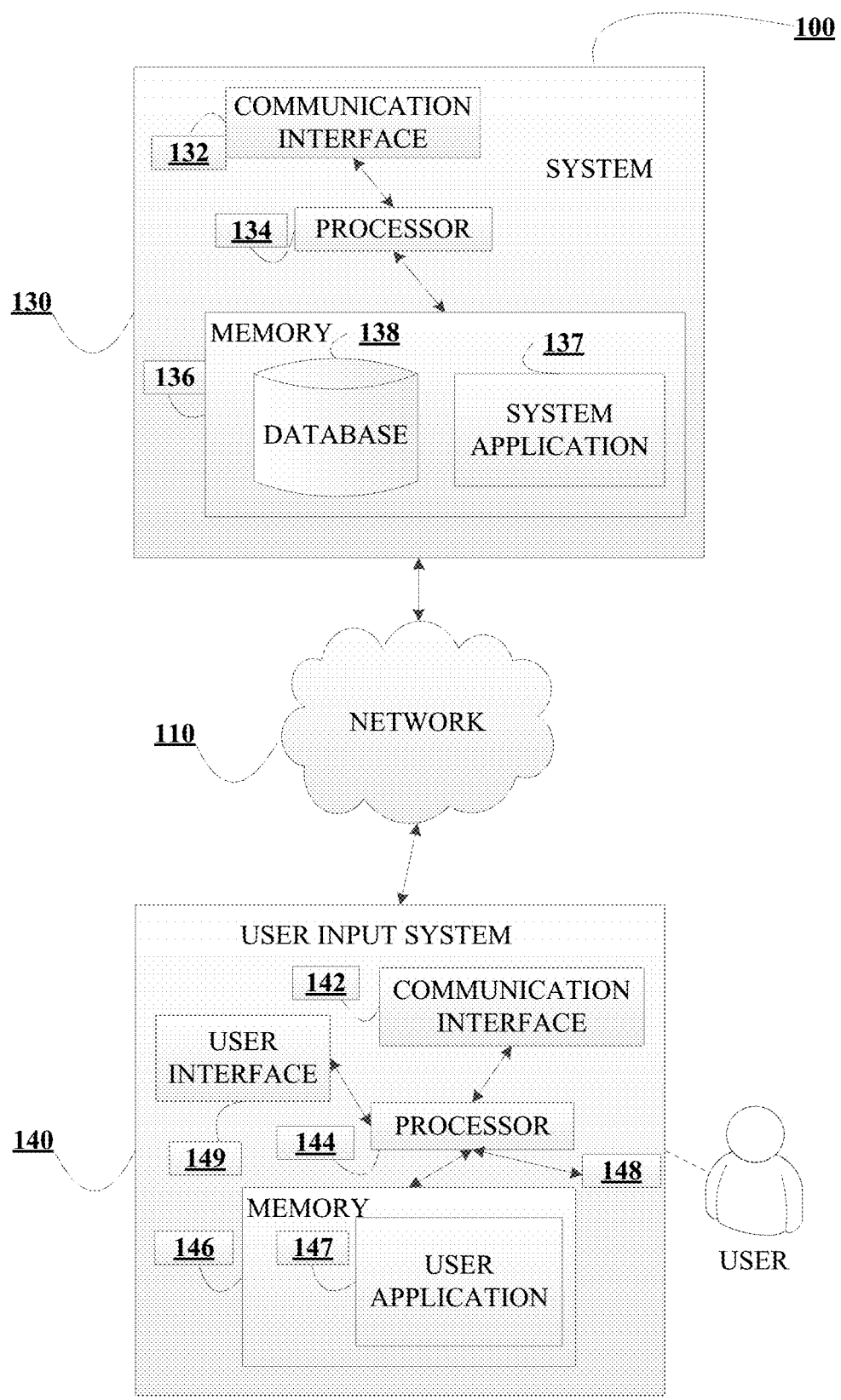

Having thus described embodiments of the invention in general terms, reference will now be made to the accompanying drawings, where:

FIG. 1 is a diagram of a system according to one embodiment of the invention for allocation of resources based on event triggers.

Figure 2A:
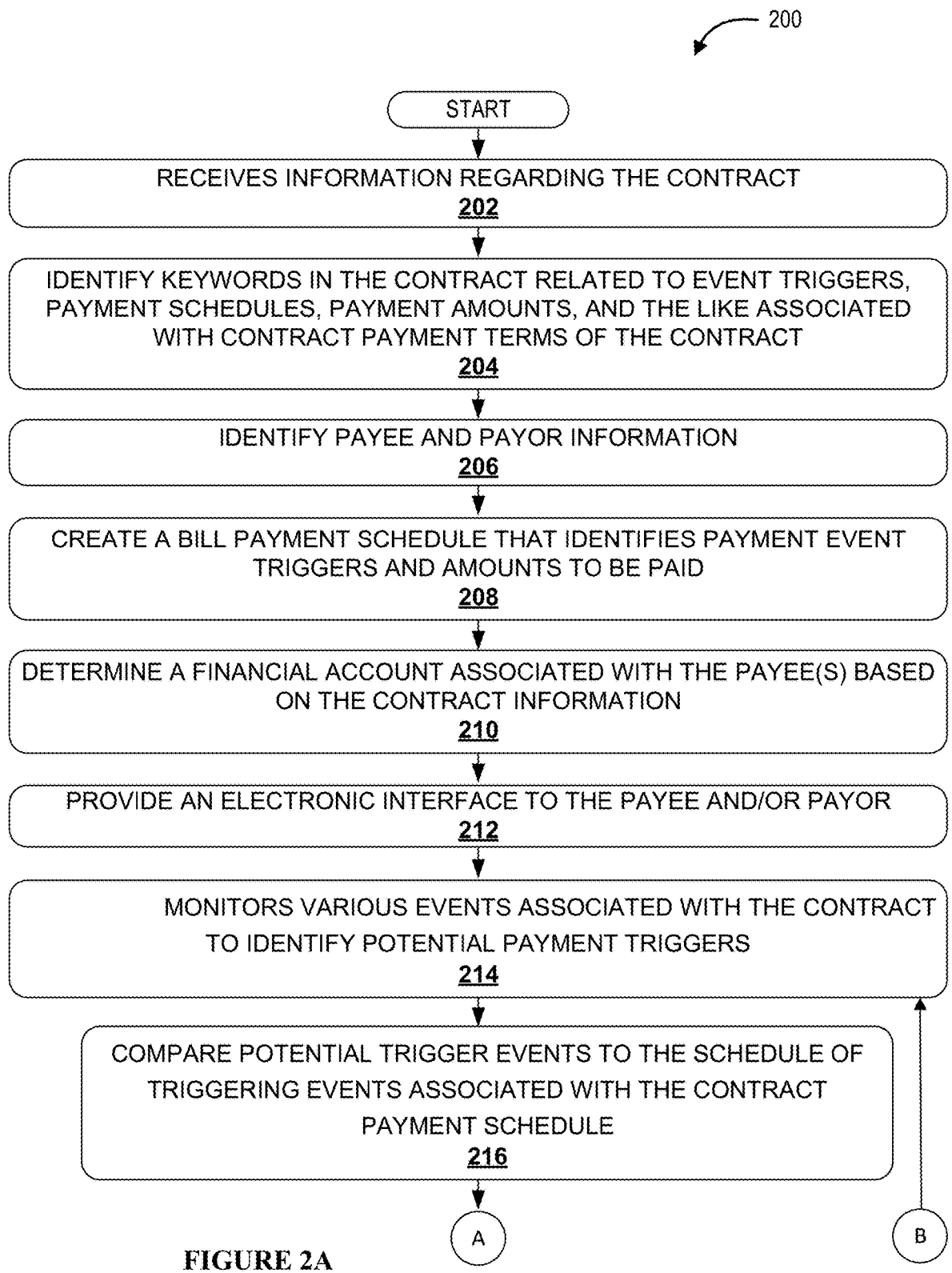
Figure 2B:
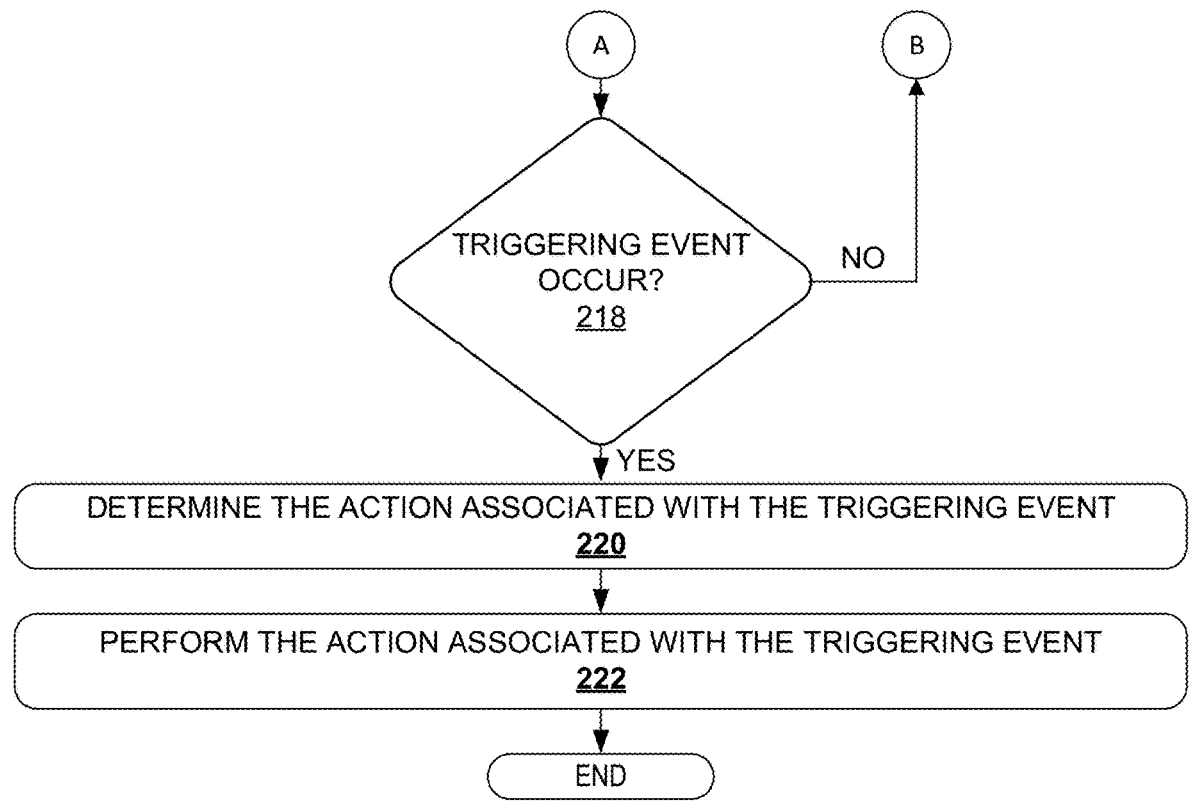

FIGS. 2A and 2B are operational diagrams of an embodiment of a method for allocation of resources based on event triggers according to one embodiment of the present invention.

Figure 3:
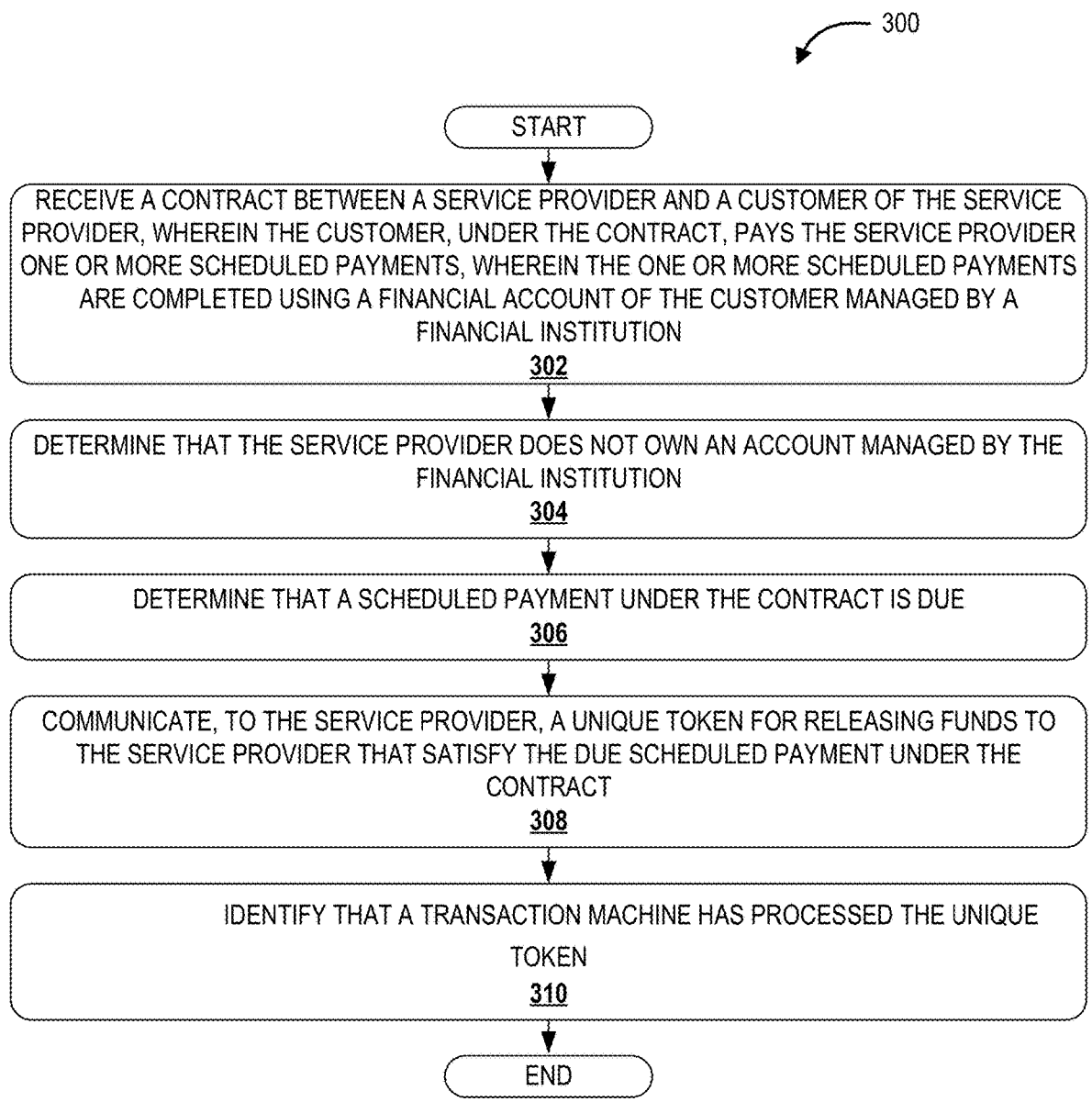

FIG. 3 is an operational diagram of an embodiment of a method for allocation of resources based on event triggers according to one embodiment of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products transferring funds of a due payment to a service provider. Generally, the invention identifies a contract between a service provider and a customer of the service provider where the customer pays the service provider using several payments overtime based on triggering events, instead of one lump sum payment. The payments may be based on the occurrence of an event or may be occur at a specified time period. For example, the contract may specify that the customer pays the service provider 10% up front, 50% after completion of a first phase of work, and the remainder after a second phase of the work.

The invention includes a system to intake either the contract itself or information from the contract. For example, the system may include an optical character recognition OCR engine or module that parses a scan of the contract into text form. Alternatively, the system may receive an electronic text version of the contract. The system may then include a text or field recognition module to identify keywords in the contract related to event triggers, payment schedules, payment amounts, and the like associated with contract payment terms of the contract. The text or field recognition module may also search for payor and payee information associated with the contract. In some instances, there may be multiple payors or payees or different payors or payees depending on the event trigger and the amount. As an alternative, the system may provide an interface that allows the customer to enter in the key terms of the contract associated with trigger events and payment.

Once the key terms of the contract are determined by the system, the system creates a bill payment schedule that identifies payment event triggers and amounts to be paid and from what payor(s) to what payee(s). The bill payment schedule is stored for use in comparing detected trigger events to the payment schedule to determine what actions should be taken.

The payee is typically a service provider, who provides either services, goods or goods and services. Once the system determines the payee (referred to herein sometimes as the service provider) from the contract information, the system may either receive account information for an account of payee from the contract or receive it from the payor. In some instances, the system may take the name, address and other information regarding the payee and search a database to determine an account associated with the payee for receiving distribution of payments from the payor. In instances, where the payee has an account with the financial institution, the system may merely transfer money accounts as a normal money transfer. If the payee has an account with another financial institution, the system can perform a standard inter-bank transfer. However, the system may determine that the payee (service provider) does not have a financial account capable of receiving funds from the customer. Based on such a determination, the invention provides the service provider a token for receiving the funds. The token may be used by the service provider to receive the funds by interacting with a transaction machine, such as an Automated Teller Machine (ATM). The token may be communicated to a computing device of the service provider, such as a mobile phone, that is capable of interacting with the transaction machine to communicate the token to the transaction machine. Alternatively, the financial institution could issue a transaction card, such as a debit card to the service provider. The invention may identify that the computing device of the customer transmitted the token to the transaction machine and cause the transaction machine to provide the service provider options for receiving the funds. This may include receiving cash payment, receiving a prepaid card that includes the funds, or an option to set up an account to receive the funds.

In operation, the system monitors various events associated with the contract. Inputs to the system may be in the form of inputs by either the customer (payor) or the service provider (payee) into the system. Alternatively, the system may monitor the accounts of the payor, the payee or both to determine transactions that may be associated with trigger events, such as the purchase of materials, purchase of other services, payments to other subcontractors or suppliers that may be associated with a defined trigger event for payments to the payee under the contract. Possible events are compared to the list of triggering events to determine a match. Fuzzy logic, neural networks, and/or heuristics may be employed to match detected events to trigger events. Once a triggering event has been detected, the system determines a payment associated with the triggering event and then distributes or segregates the payment from the account for either transferring to an account of the payee or multiple payees or generation of tokens to be used by the payee(s) to access the transferred funds.

FIG. 1 presents an exemplary block diagram of the system environment 100 for implementing the process flows described herein in accordance with embodiments of the present invention. As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute a user application 147. The user application 147 may be an application to communicate with the system 130, perform a transaction, input information onto a user interface presented on the user input system 140, or the like. The user application 147 and/or the system application 137 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

The user input system 140 may include any computerized apparatus that can be configured to perform any one or more of the functions of the user input system 140 described and/or contemplated herein. For example, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like. In some embodiments, for example, the user input system 140 may include a personal computer system (e.g. a non-mobile or non-portable computing system, or the like), a mobile computing device, a personal digital assistant, a mobile phone, a tablet computing device, a network device, and/or the like. As illustrated in FIG. 1, in accordance with some embodiments of the present invention, the user input system 140 includes a communication interface 142, a processor 144, a memory 146 having an user application 147 stored therein, and a user interface 149. In such embodiments, the communication interface 142 is operatively and selectively connected to the processor 144, which is operatively and selectively connected to the user interface 149 and the memory 146. In some embodiments, the user may use the user application 147 to execute processes described with respect to the process flows described herein. Specifically, the user application 147 executes the process flows described herein.

Each communication interface described herein, including the communication interface 142, generally includes hardware, and, in some instances, software, that enables the user input system 140, to transport, send, receive, and/or otherwise communicate information to and/or from the communication interface of one or more other systems on the network 110. For example, the communication interface 142 of the user input system 140 may include a wireless transceiver, modem, server, electrical connection, and/or other electronic device that operatively connects the user input system 140 to another system such as the system 130. The wireless transceiver may include a radio circuit to enable wireless transmission and reception of information. Additionally, the user input system 140 may include a positioning system. The positioning system (e.g. a global positioning system (GPS), a network address (IP address) positioning system, a positioning system based on the nearest cell tower location, or the like) may enable at least the user input system 140 or an external server or computing device in communication with the user input system 140 to determine the location (e.g. location coordinates) of the user input system 140.

Each processor described herein, including the processor 144, generally includes circuitry for implementing the audio, visual, and/or logic functions of the user input system 140. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 147 of the memory 146 of the user input system 140.

Each memory device described herein, including the memory 146 for storing the user application 147 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

As shown in FIG. 1, the memory 146 includes the user application 147. In some embodiments, the user application 147 includes an interface for communicating with, navigating, controlling, configuring, and/or using the user input system 140. In some embodiments, the user application 147 includes computer-executable program code portions for instructing the processor 144 to perform one or more of the functions of the user application 147 described and/or contemplated herein. In some embodiments, the user application 147 may include and/or use one or more network and/or system communication protocols.

Also shown in FIG. 1 is the user interface 149. In some embodiments, the user interface 149 includes one or more output devices, such as a display and/or speaker, for presenting information to the user. In some embodiments, the user interface 149 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 149 includes the input and display devices of a mobile device, which are operable to receive and display information.

FIG. 1 also illustrates a system 130, in accordance with an embodiment of the present invention. The system 130 may refer to the "apparatus" described herein. The system 130 may include any computerized apparatus that can be configured to perform any one or more of the functions of the system 130 described and/or contemplated herein. In accordance with some embodiments, for example, the system 130 may include a computer network, an engine, a platform, a server, a database system, a front end system, a back end system, a personal computer system, and/or the like. Therefore, the system 130 may be a server managed by the business. The system 130 may be located at the facility associated with the business or remotely from the facility associated with the business. In some embodiments, such as the one illustrated in FIG. 1, the system 130 includes a communication interface 132, a processor 134, and a memory 136, which includes a system application 137 and a structured database 138 stored therein. As shown, the communication interface 132 is operatively and selectively connected to the processor 134, which is operatively and selectively connected to the memory 136.

It will be understood that the system application 137 may be configured to implement any one or more portions of the various user interfaces and/or process flow described herein. The system application 137 may interact with the user application 147. It will also be understood that, in some embodiments, the memory includes other applications. It will also be understood that, in some embodiments, the system application 137 is configured to communicate with the structured database 138, the user input system 140, or the like.

It will be further understood that, in some embodiments, the system application 137 includes computer-executable program code portions for instructing the processor 134 to perform any one or more of the functions of the system application 137 described and/or contemplated herein. In some embodiments, the system application 137 may include and/or use one or more network and/or system communication protocols.

In addition to the system application 137, the memory 136 also includes the structured database 138. As used herein, the structured database 138 may be one or more distinct and/or remote databases. In some embodiments, the structured database 138 is not located within the system and is instead located remotely from the system. In some embodiments, the structured database 138 stores information or data described herein.

It will be understood that the structured database 138 may include any one or more storage devices, including, but not limited to, datastores, databases, and/or any of the other storage devices typically associated with a computer system. It will also be understood that the structured database 138 may store information in any known way, such as, for example, by using one or more computer codes and/or languages, alphanumeric character strings, data sets, figures, tables, charts, links, documents, and/or the like. Further, in some embodiments, the structured database 138 may include information associated with one or more applications, such as, for example, the system application 137. It will also be understood that, in some embodiments, the structured database 138 provides a substantially real-time representation of the information stored therein, so that, for example, when the processor 134 accesses the structured database 138, the information stored therein is current or substantially current.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In addition, the various portions of the system environment 100 may be maintained for and/or by the same or separate parties. It will also be understood that the system 130 may include and/or implement any embodiment of the present invention described and/or contemplated herein. For example, in some embodiments, the system 130 is configured to implement any one or more of the embodiments of the process flows described and/or contemplated herein in connection any process flow described herein. Additionally, the system 130 or the user input system 140 is configured to initiate presentation of any of the user interfaces described herein.

FIGS. 2A and 2B illustrates a high level method 200 of operation for allocation of resources based on event triggers. In the illustrated embodiment, the system is associated with a contract or multiple contracts between one or more payors (customers) and one or more payees (service providers). They system initially receives information regarding the contract (see block 202). The system intakes either the contract itself or information from the contract. For example, the system may include an optical character recognition OCR engine or module that parses a scan of the contract into text form. Alternatively, the system may receive an electronic text version of the contract. The system may then include a text or field recognition module to identify keywords in the contract related to event triggers, payment schedules, payment amounts, and the like associated with contract payment terms of the contract. (See block 204). The text or field recognition module may also search for payor and payee information associated with the contract. (See block 206). In some instances, there may be multiple payors or payees or different payors or payees depending on the event trigger and the amount. As an alternative to the operations of block 204 and 206, the system may provide an interface that allows the customer to enter in the key terms of the contract associated with trigger events and payment.

Once the key terms of the contract are determined by the system, the system creates a bill payment schedule that identifies payment event triggers and amounts to be paid and from what payor(s) to what payee(s). (See block 208). The bill payment schedule is stored for use in comparing detected trigger events to the payment schedule to determine what actions should be taken.

The system next determines a financial account associated with the payee(s) based on the contract information. (See block 210). In some embodiments, the account number or wire transfer information may be in the contract or provided by the payor or payee. In other embodiments, the system may use payee information, such as name, address, corporate number, etc. to identify the payee. This information can be used to search a database of accounts to identify an account associated with the payee. In some embodiments, the system may use contact information associated with the payee from the contract, such as mailing address, email address, phone number (call or text) to receive either the account number or authorization to use an account located by the system for receipt of payments.

The system may provide an electronic interface to the payee, payor, or both the payee and payor that allows them to monitor the payment schedules, payment amounts, account information, etc. associated with the contract. (See block 212). Via the interface, the payee or payor may update information, communicate with each other, etc.

The system enters a monitoring mode, whereby it monitors various events associated with the contract to identify potential payment triggers. (See block 214). Monitoring may take various forms. In some embodiments, the system monitors inputs to the system made by the payor, payee or both. For example, the payor or payee may enter information into the system information associated with a trigger event, such as entering a message that flooring is complete to meet a payment trigger associated with completion of a flooring job as part of a project. In other or additional embodiments, the system may monitor one or both the payor and payee's financial accounts, email accounts, text messages, etc. looking for events that may correspond to triggering events. For example, the payor and payee may send emails or text messages related to the contract, such as a message that the flooring project is complete. As another example, a payor or payee may make financial transactions that may be associated with a trigger event. For example, if one of the triggers for payment in the contract is completion of floor finishing and the system notes that the payor has paid a moving company, then the system may infer that the trigger event of finishing the floors has occurred. As another example, if the system determines that the payee (service provider) has made a payment to a flooring subcontractor from the payee's account, this may also be an indication that a triggering event has occurred.

When potential triggering events are detected, the system compares them to the schedule of triggering events associated with the contract payment schedule. (See block 216). In some instances, this may be straightforward, where either the payor or payee has input a notification that the event has occurred, such as entering a message into the system, clicking a box, or the like. In some instances, the system employs logic to correlate a detected event with a possible trigger event. For example, the system may use a logic tree, fuzzy logic, neural networks, heuristics, and the like to match one or more monitored events with a triggering event. For example, an indication that the payor has paid a mover and an indication that the payee has paid flooring subcontractor may correlate via logic analysis that trigger event for completion of floor refinishing.

Once the system has determined that a triggering event has occurred (see block 218), the system determines the action associated with the triggering event. (See block 220). In some instances, the associated action is the payment of funds from the payor to the payee. However, other various actions may be associated with the triggering event, such as sending notifications to the payor or payee, opening an account, scheduling a loan by the payor to make payments to the payee, notifying employees of the financial institution servicing either the payor or the payee's account, etc. In some embodiments, the system may seek confirmation from either the payor or payee prior to taking an action as confirmation. For example, upon the occurrence of a detected trigger event, the system may send a message to the payor indicating information association with a particular trigger event and request confirmation prior to performing the action associated with the triggering event.

Once confirmation is received, the system then performs the action associated with the triggering event. (See block 222). This may be the transfer of funds to the payee or some other action as discussed above.

FIG. 3 illustrates a particular embodiment of a method 300 for transferring funds of a due payment to a service provider. Block 302 illustrates receiving a contract between a service provider and a customer of the service provider. The contract specifies one or more scheduled payments due to the service provider from the customer. Payments are made using a financial account of the customer that is managed by a financial institution. For example, a home owner may desire to have repairs done to their home. The home owner contracts with a contractor to make the repairs. A contract signed between the home owner and the contractor may specify payment terms of: 25% due at the time of signing; 50% due after completion of a first phase of the work; and 25% due upon completion of the remainder of the work.

In some embodiments, the contract may specify conditions that must be satisfied prior to payment of a given amount due under the contract. The condition may be a triggering event agreed upon between the parties that may be a condition of the contract or a condition outside of the contract. Therefore, a determination of an occurrence of the triggering event is performed, thus resulting in the determination that the scheduled payment under the contract is due. An example of a condition of the contract may be performance of an action of one of the parties of the contract. An example of a condition outside of the contract may include the sale of property that is not subject to the contract or a stock price reaching a given amount or the opening of a loan by the payor to cover payments due to the payee under the contract. The triggering event may be monitored to determine whether the condition has been satisfied. Monitoring the triggering event may be accomplished by monitoring a parameter of the condition. For example, if a triggering event were to occur when a stock price fell beneath a given price level, monitoring could be performed on the price of the stock. In some embodiments, a notification may be sent to the customer and in some conditions the service provider indicating the satisfaction of the condition based on detecting the occurrence of the triggering event. The notification may include a request to confirm the occurrence of the triggering event.

In other embodiments, a condition may be used to calculate the price due to the service provider. For example, the condition includes a price of a given material needed to complete an action of the contract. It is important to note that the condition explained may be different than a condition used to determine whether the payment is due as explained above. In some embodiments, the condition may further include a triggering event associated with a scheduled payment under the terms of the contract to determine a price due to the service provider. For example, a triggering even may include the passage of a date. And the condition of the contract may specify that if a contractor of the contract performs an action under the contract prior to the passage of the date, the contractor will be paid a first amount. However, if the contractor should fail to perform the action under the contract prior to the passage of the date, the contractor will be paid a second amount. A notification may be sent to request verification of the triggering event. In some embodiments, the price due to the service provider may be included in one of multiple tiers. The tiers may specify the condition. For example a tier may specify the condition of a part used to fix an automobile by a mechanic. If the mechanic installs a part that is new, a first rate will apply. If the mechanic installs a refurbished part, a second rate will apply. Alternatively, if the mechanic installs a used part, a third rate will apply.

In some embodiments, the contract is received based on a physical copy of the contract being scanned. The scanned version of the contract may be analyzed to determine the one or more payment terms of the contract and also any conditions that may apply under the contract. Analysis of the contract may be performed by first applying an optical character recognition (OCR) algorithm to identify characters of the contract. After identifying the characters, analysis of the characters may be performed to identify the payment terms. The analysis may include finding numerical amounts in the contract that may include international recognized monetary symbols (e.g. $). By identifying the international recognized monetary symbols associated with the payments terms of the contract, a further step may be performed to convert the monetary amount from a first currency to an amount of a second currency after identifying a conversion rate between the first and second currencies.

In the embodiment of FIG. 2, the system determines that the payee has an associated account for receiving payments. In this embodiment of the invention, as defined in FIG. 3, block 304, a determination is made that the service provider does not own an account managed by the financial institution or an account at all. Such a determination may be performed by receiving and comparing an identifier of the service provider against a list of known identifiers of customers of the financial institution. If the identifier of the service provider is among the list of known identifiers of the customers of the financial institution, the service provider is determined not to have an account managed by the financial institution. In some embodiments, a request may be sent to the service provider requesting the service provider identify a financial account of the service provider that is managed by a second financial institution. Such financial account may be used to receive an amount due to the service provider under the payment terms of the contract. The service provider may communicate a response back identifying the financial account owned by the service provider.

In other embodiments, instead of the service provider identifying an account for receiving funds from due payments under the contract, the service provider may request to receive the funds using an alternate method. These alternate methods may include receiving a cash payment, or receiving a prepaid card that includes an amount based on the funds from the due payments of the contract.

As illustrated in block 306, a scheduled payment due under the contract is identified. Such a determination may be made as explained in block 302. After determining that a scheduled payment is due under the contract, a unique token may be transferred to the service provider, as identified in block 308. The unique token is associated with the funds due to the service provider from the scheduled due payment under the contract. The unique token may be redeemed to receive the funds from the payment due under the contract. In some embodiments, this unique token may be a single-use token that may be redeemed only once. In other embodiments, when the token is initially redeemed, a temporary account may be established and funds due to the service provider under the contract are transferred from the account of the customer into the temporary account. The temporary account is identified by the service provider. Funds may be retrieved by the service provider from the temporary account using the unique token. In some embodiments, communicating the unique token to the service provider may be accomplished by communicating the unique token to a computing device, such as a mobile device, of the service provider. For communicating the token to the computing device of the service provider, an application may be installed on the computing device that causes the computing device to communicate with a token server. The application communicates an authentication credential identifying the service provider to the token server. The token server communicates a notification to the computing device that a token is available for download. The token server may associate the unique token with the computing device such that only the computing device must be authenticated prior to the unique token being processed. The computing device and the token server may create a secure channel for transferring the unique token from the token server to the computing device. Upon receiving the unique token, the computing device stores the unique token in memory. Additionally, the unique token may identify the financial institution of the customer.

As identified by block 310, a determination is made that the unique token has been processed by a transaction machine. The transaction machine may be an automated teller machine (ATM), a Point-of-Sale Terminal, and the like. In some embodiments, the transaction machine may be managed by the financial institution. In other embodiments, the transaction machine may be managed by a third-party that is not directly associated with the financial institution but is still capable of processing a unique token associated.

Where the unique token is stored on a computing device of the service provider, the transaction machine may receive the unique token by communicating with the computing device. In some embodiments, the computing device is configured to communicate the unique token to the transaction machine using a Near Field Communication (NFC) transmitter, an RF transmitter (e.g. Bluetooth, WiFi), a wired link, and the like. In other embodiments, an application stored on the computing device is configured to modify the unique token prior such that only a token server that receives the modified unique token is capable of identifying the unique token. The application may create the modified unique token using an identifier that identifies the computing device upon which the application is installed. Thus, when the token server receives the modified unique token, the token server may identify both the unique token and the computing device. In other embodiments, when communicating the unique token to the transaction machine, the computing device may generate a package containing the unique token and other information (e.g. date/time information, routing information).

In some embodiments, the unique token includes information that identifies a financial institution for directing the unique token. After the transaction machine receives the unique token, the transaction machine analyzes the unique token to identify the financial institution. Upon identifying the financial institution, the transaction machine may communicate the unique token to a token server of the financial institution. In some embodiments, prior to communicating the unique token to the token server of the financial institution, transaction machine may request the server provider to become authenticated with the transaction machine. For example, the transaction machine may request the server provider to present a personal identification number (PIN) or the like. Upon authenticating the service provider, the transaction machine may communicate the transaction machine to the token server. The transaction machine may further attach information to the unique token that identifies the transaction machine and may further include additional date/time information.

Upon receipt of the unique token and possibility other information associated with the unique token, the token server may authenticate the transaction prior to processing the unique token. Where the unique token was modified by the application of the computing device using an identifier of the computing device, the token system may first identify the computing device. The token server may then determine whether the unique token is associated with the computing device. If the unique token is associated with the computing device, the token server may process the token. If the unique token is not associated with the computing device, the token server may deny to process the unique token. If the computing device denies to process the unique token, the token server may cause the transaction machine to display the token server denied processing the authentication token. The token server may authenticate the unique token using information about the transaction machine prior to processing the unique token. The token server may be configured to only process unique tokens communicated by authorized transaction machines. Authorized transaction machines may include transaction machines that are associated with a financial institution of the token server, transaction machines that are located within predefined geographical regions, and the like. Additionally, the token machine may compare date/time information to authenticate the unique token. For example, the token server may only process unique tokens that are received by the transaction machine within predefined time periods. In other embodiments, the token server may be configured to limit the number of unique tokens associated with a service provider within a time period.

After authenticating the unique token, the token server may cause the transaction machine to display a request for the service provider to identify an account of the service provider for receiving funds of the due payment. The message may further include a request for the service provider to identify an alternate means of receiving funds from the due payment. These alternate means may include receiving a cash payment or a pre-paid card including an amount of funds. The transaction machine may include a user input controls able to receive the financial account of the customer or an alternate means of receiving the funds. If the service provider selects to transmit funds to a financial account of the server provider, the token server may process a transfer between the account of the customer and the financial account of the service provider. If the service provider selects to receive a cash payment, the token server may direct the transaction machine to dispense an amount of cash to the service provider. The token server may then deduct an amount of funds from an account of the customer. If the service provider elects to receive a pre-paid-card, the token server may direct the transaction machine to generate a pre-paid card with an amount of funds. Such amount of funds on the pre-paid card may be less than the funds of the due payment.

In other embodiments, the service provider may elect to receive less than a total amount of the funds of the payment due. In such an embodiment, the token server may generate a temporary financial account associated with the service provider and transfer an amount of funds from the account of the customer into the temporary account. The service provider may then use the unique token to withdraw funds from the temporary account until the balance of the financial account reaches zero. Upon the balance of the temporary account reaching zero, the token server may eliminate the temporary account. In some embodiments, prior to eliminating the temporary account, the token server may identify a subsequent due payment has occurred. The token server may transfer funds associated with the subsequent due payment into the temporary account automatically. In such embodiments, a notification may be sent to the service provider.

In some embodiments, where the service provider has elected to receive funds using a temporary account. The token server may communicate a notification to the service provider with an option for the service provider to convert the temporary account into a regular financial account (e.g. a checking account). The service provider may communicate a response indicating the service provider desires to convert the temporary account into a regular financial account. Upon receiving such a response, the token server may convert the temporary account into a regular account.

In some embodiments of the invention, communicating the unique token to the service provider is based on receiving permission from the customer to release the funds that satisfy the due scheduled payment under the contract. A request to the customer to release the funds. The request may be sent to a computing device of the customer that allows the customer to provide user input that causes the computing device to communicate a response that includes whether the customer desires to release the funds.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| Docket Number | U.S. patent application Ser. No. | Title | Filed On |
| --- | --- | --- | --- |
| 6952US1.014033.2574 | 14/987,746 (now published as U.S. patent application Pub. No. 2017/0192635) | MOBIUE APPLICATION CONFIGURATION BASED ON GEOGRAPHIC AND TRANSACTION HISTORY CONTEXT | Jan. 4, 2016 |
| 6954US1.014033.2575 | 14/987,042 (now published as U.S. patent application Pub. No. 2017/0193421) | WORK FLOW SCHEDULE RECONCILIATION AND DATA PUSH | Jan. 4, 2016 |
| 6957US1.014033.2576 | 14/987,052 (now U.S. Pat. No. 9,679,426) | MALFEASANCE DETECTION BASED ON IDENTIFICATION OF DEVICE SIGNATURE | Jan. 4, 2016 |
| 6953US1.014033.2578 | 14/987,696 (now published as U.S. patent application Pub. No. 2017/0193410) | ALTERNATIVE CHANNEL SELECTION BASED ON PREDICTIVE WORK FLOW | Jan. 4, 2016 |

What is claimed is:

1. A system for transferring funds of a due payment to a service provider, the system comprising:
    a financial institution server, the financial institution server comprising:
        a financial institution server processor;
        a financial institution server memory; and
        a financial institution server module comprised in the financial institution server memory comprising code executable by the financial institution server processor, when executed by the financial institution server processor, causes the financial institution server processor to:
            receive an electronic copy of a contract between a service provider and a customer of the service provider, wherein the contract comprises a triggering event;
            identify a scheduled payment owed by the customer to the service provider by parsing the electronic copy of the contract;
            electronically monitor email accounts of the service provider and customer;
            in response to electronically monitoring the email accounts of the service provider and customer, identify an occurrence of the triggering event;

determine that the service provider does not own an account capable of receiving funds from the customer;

in response to identifying the occurrence of the triggering event, determine that the scheduled payment under the contract is due;

in response to determining that the scheduled payment under the contract is due, communicate, to a computing device of the service provider, a unique token;

associate a unique identifier of the computing device with the unique token;

receive a modified unique token from a transaction machine;

determine that the modified unique token comprises the unique token and the unique identifier of the computing device;

in response to determining that the modified unique token comprises the unique token and the unique identifier of the computing device, authenticate the modified unique token; and in response to the authentication of the modified unique token, sending instruction to the transaction machine in order to dispense cash or prepaid card;

the transaction machine, the transaction machine comprising:

a transaction machine processor;

a transaction machine memory; and a transaction machine module comprised in the transaction machine memory comprising code executable by the transaction machine processor, when executed by the transaction machine processor, causes the transaction machine processor to:

receive the modified unique token from the computing device of the service provider;

send the modified unique token to the financial institution server;

receive the instruction from the financial institution sever; and in response to the received instruction (i) dispense a prepaid transaction card, or (ii) dispense cash.

2. The system of claim 1, wherein communicating the unique token to the service provider is based on receiving permission from the customer.

3. The system of claim 1, wherein the transaction machine module, when executed by the transaction machine processor, further causes the transaction machine processor to dispense the prepaid transaction card.

4. The system of claim 1, wherein the transaction machine module, when executed by the transaction machine processor, further causes the transaction machine processor to dispense the cash.

5. The system of claim 1, wherein determining that the scheduled payment under the contract is due further comprises requesting confirmation from the customer that the triggering event has occurred; and receiving the confirmation from the customer that the triggering event has occurred.

6. The system of claim 5, wherein the unique token is communicated to the computing device of the service provider based on receiving the confirmation from the customer that the triggering event has occurred.

7. The system of claim 3, wherein the prepaid transaction card has a value that is less than or equal to an amount of the scheduled payment.

8. The system of claim 3, wherein the prepaid transaction card has a value that is equal to an amount of the scheduled payment.

9. The system of claim 4, wherein the cash has a value that is less than or equal to an amount of the scheduled payment.

10. The system of claim 4, wherein the cash has a value that is equal to an amount of the scheduled payment.

11. The system of claim 1, wherein the transaction machine is an automated teller machine.

12. The system of claim 1, wherein the transaction machine is a point-of-sale terminal.

13. The system of claim 1, wherein the unique token is a single-use token.

* * * * *